(12) United States Patent
Oishi

(10) Patent No.: US 7,584,937 B2
(45) Date of Patent: Sep. 8, 2009

(54) LINEAR SOLENOID WITH ABUTTED PORTION

(75) Inventor: Kenichi Oishi, Obu (JP)

(73) Assignee: DENSO Corporation, Kariya (JP)

( * ) Notice: Subject to any disclaimer, the term of this patent is extended or adjusted under 35 U.S.C. 154(b) by 261 days.

(21) Appl. No.: 11/644,903

(22) Filed: Dec. 26, 2006

(65) Prior Publication Data

US 2007/0158606 A1 Jul. 12, 2007

(30) Foreign Application Priority Data

Jan. 10, 2006 (JP) .............................. 2006-002763

(51) Int. Cl.
*F16K 31/02* (2006.01)
(52) U.S. Cl. .................. 251/129.15; 335/296
(58) Field of Classification Search ............ 251/129.15; 335/296, 297
See application file for complete search history.

(56) References Cited

U.S. PATENT DOCUMENTS 5,476,313 A * 12/1995 Lauer ...................... 303/119.2
6,092,781 A * 7/2000 Hohl et al. ............. 251/129.02
6,918,570 B2 * 7/2005 Ahn ....................... 251/129.15
7,325,564 B2 * 2/2008 Ryuen et al. ................. 137/375

FOREIGN PATENT DOCUMENTS

JP 2004-144230 5/2004

* cited by examiner

*Primary Examiner*—John K Fristoe, Jr.
(74) *Attorney, Agent, or Firm*—Nixon & Vanderhye P.C.

(57) ABSTRACT

A linear solenoid is disclosed that includes a coil that generates magnetic force due to transmission of current therethrough. The linear solenoid also includes a plunger with an end face, a stator that movably supports the plunger, and a yoke including a bottom face. Furthermore, a biasing member is included that biases the plunger in a first direction along the axis. The stator magnetically attracts the plunger when current is transmitted through the coil so as to move the plunger in a second direction along the axis opposite to the first direction. Also, when current transmission through the coil is stopped, the biasing member biases the plunger to abut the bottom face of the yoke at least one abutted portion. Also a non-contact portion is included between the abutted portions where the plunger and the stator are spaced away from each other in the direction of the axis.

22 Claims, 5 Drawing Sheets

LINEAR SOLENOID WITH ABUTTED PORTION

CROSS REFERENCE TO RELATED APPLICATION

The following is based on and claims priority to Japanese Patent Application No. 2006-2763, filed Jan. 10, 2006, which is hereby incorporated by reference in its entirety.

FIELD

The present invention generally relates to a linear solenoid and, more specifically, relates to a linear solenoid with an abutted portion.

BACKGROUND

There are known electromagnetic valves (e.g., electromagnetic hydraulic control valves) equipped with a linear solenoid that generate a drive output corresponding to an amount of transmitted current. For example, Japanese Unexamined Patent Publication No. 2004-144230 discloses such a valve.

The linear solenoid disclosed in Japanese Unexamined Patent Publication No. 2004-144230 includes a plunger that is slidably supported in a stator. The plunger is biased toward the bottom face of a yoke by a return spring. Thus, when current transmission through a coil is stopped, an end face of the plunger abuts against the bottom face of the yoke. However, when current is transmitted through the coil, the plunger moves away from the bottom face of the yoke against the biasing force of the spring.

When current transmission to the coil is stopped, the entire end face of the plunger abuts the bottom face of the yoke. As a result, when current begins to be transmitted through the coil, the area between the end face of the plunger and the bottom face of the yoke is under negative pressure, thereby hindering the initial movement of the plunger. Initial movement of the plunger is especially hindered when the space between the plunger and the yoke is filled with high viscosity oil (e.g., oil at low temperature, etc.).

In partial response to this problem, it is proposed to include a circular recessed portion J1 in the center of the bottom face of the yoke 34 so that only the outer circumferential edge of the plunger 32 abuts against the bottom face of the yoke 34 as illustrated in FIG. 1A. Thus, a space is ensured between the end face of the plunger 32 and the bottom face of the yoke 34. Also, a second recessed portion 43 (i.e., a breathing groove) extends radially through the annular abutted portion 44 so that oil can flow into and out of the space between the plunger 32 and the yoke 34. Thus, the plunger 32 moves more easily when current transmission begins.

When current transmission through the coil is stopped, the biasing member 5 biases the plunger 32 such that the plunger 32 abuts the bottom face of the yoke 34, as illustrated in FIG. 2A. However, when current transmission begins, magnetic flux I' flows such that the stator magnetically attracts the plunger 32. In addition, magnetic flux II' also flows in the abutted portion 44 between the end face of the plunger 32 and the bottom face of the yoke 34. Thus, the attractive force is generated that causes the attracting stator to magnetically attract the plunger 32. (This attractive force will be hereafter referred to as the first force indicated by the Roman numeral I.) In addition, the force by which the plunger 32 adheres to the bottom face of the yoke 34, i.e., attractive force in the direction opposite the first force I, is generated. (This force will be hereafter referred to as the second force indicated by the Roman numeral II.)

Solid line A in FIG. 2B graphically illustrates the behavior of the conventional valve. Broken line B represents a balance point of the plunger 32 where the plunger 32 is balanced in the axial direction of the stator (i.e., where the magnetic attractive force, the biasing force of the return spring, and the feedback axial force that acts on the spool are balanced).

The second force II can be substantially strong. As indicated by solid line A, the attractive force that acts on the plunger 32 is reduced especially on the side where the stroke of the plunger 32 is small. Also, two balance points 1, 2 are produced where the solid line A intersects the balance line B.

When current transmission to the coil begins and is gradually increased, the plunger 32 can jump instantaneously from the balance point 1 to the balance point 2. The spool moves integrally with the plunger 32.

Thus, in cases where the spool valve controls oil pressure, as illustrated by line C in FIG. 2C, the oil pressure P can jump from point 1 to point 2 as indicated by the arrow. This jump in oil pressure is undesirable.

SUMMARY

A linear solenoid with an axis is disclosed that includes a coil that generates magnetic force due to transmission of current therethrough. The linear solenoid also includes a plunger with an end face, a stator that movably supports the plunger, and a yoke including a bottom face. Furthermore, the linear solenoid includes a biasing member that biases the plunger in a first direction along the axis. The stator magnetically attracts the plunger when current is transmitted through the coil so as to move the plunger in a second direction along the axis opposite to the first direction. Also, when current transmission through the coil is stopped, the biasing member biases the plunger to abut the bottom face of the yoke at a plurality of abutted portions. Moreover, a non-contact portion is included between the abutted portions where the plunger and the stator are spaced away from each other in the direction of the axis.

Also, a linear solenoid with an axis is disclosed that includes a coil that generates magnetic force due to transmission of current therethrough. The linear solenoid also includes a plunger with an end face and an edge, a stator that movably supports the plunger, a yoke including a bottom face, and a biasing member that biases the plunger in a first direction along the axis. The stator magnetically attracts the plunger when current is transmitted through the coil so as to move the plunger in a second direction along the axis opposite to the first direction. When current transmission through the coil is stopped, the biasing member biases the plunger to abut the bottom face of the yoke at an abutted portion. Also, the abutted portion is provided within the edge of the plunger when viewed along the axis. Moreover, a non-contact portion is included where the plunger and the stator are spaced away from each other in the direction of the axis.

DETAILED DESCRIPTION OF THE EMBODIMENTS

Figure 3:
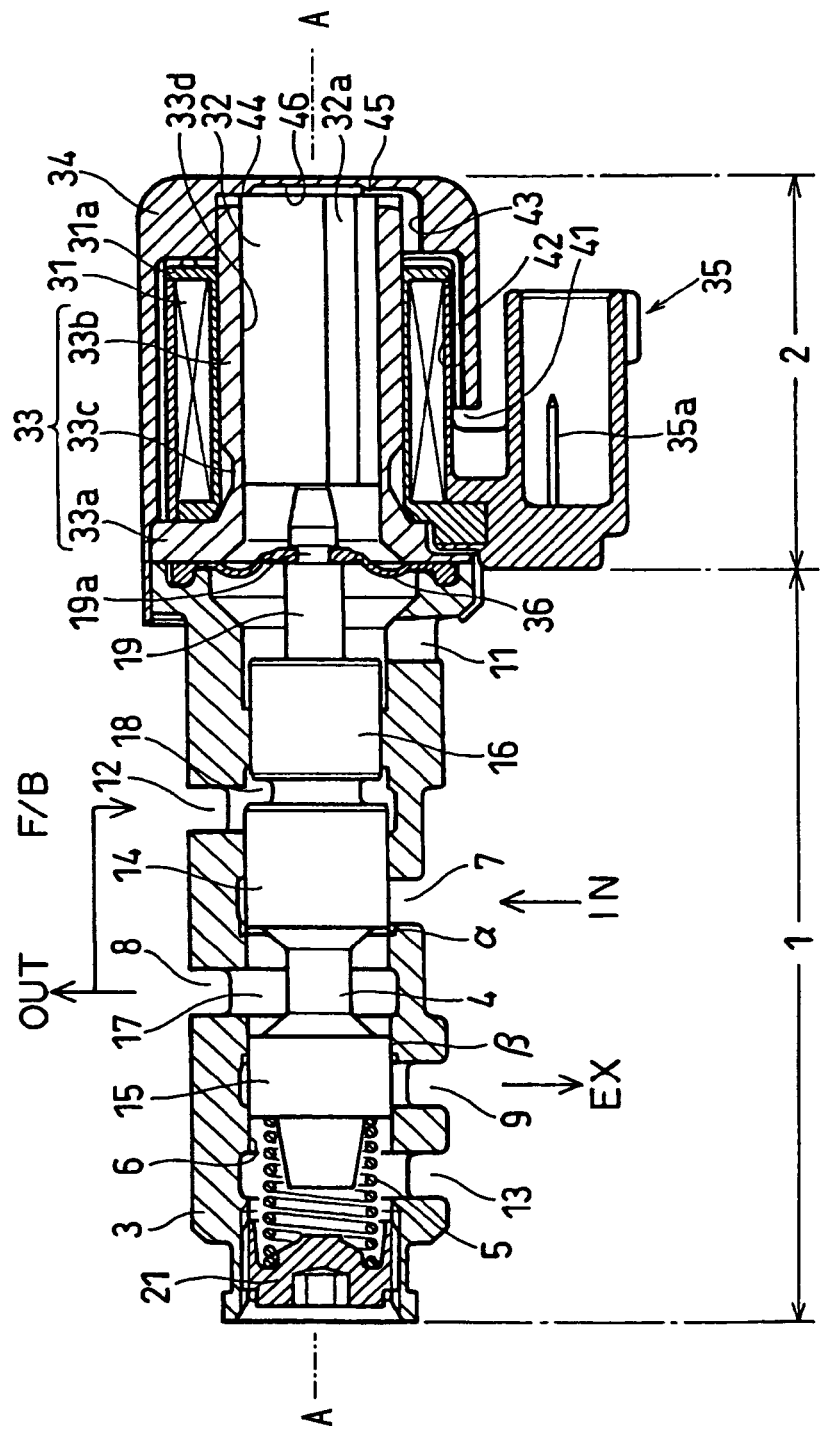
FIG. 3 is a longitudinal sectional view of an electromagnetic hydraulic control valve constructed according to the present disclosure.

Referring initially to FIG. 3, a valve assembly (e.g., an electromagnetic valve, an electromagnetic hydraulic control valve, etc.) is illustrated. In one embodiment, the valve assembly is mounted in a hydraulic control device for an automatic transmission. The valve assembly includes a combination of a spool valve 1 that forms a hydraulic control valve for changing oil pressure or regulating oil pressure and a linear solenoid 2 that drives the spool valve 1. The linear solenoid 2 and the spool valve 1 share a common axis, A. In one embodiment, the valve assembly is an electromagnetic hydraulic control valve of N/O (Normally Open) type. As such, when the linear solenoid 2 is off, the degree of communication between an input port 7 and an output port 8, to be described later, is maximized, and the degree of communication between the output port 8 and an exhaust port 9, to be described later, is minimized (closed).

The spool valve 1 includes a sleeve 3, a spool 4, and a biasing member. In the embodiment shown, the biasing member is a return spring 5. The sleeve 3 can be provided in a hole formed in a hydraulic controller (not shown).

The sleeve 3 includes an insertion hole 6. The spool 4 is provided in the insertion hole 6 so that the spool 4 can slide in the axial direction of the sleeve 3. The sleeve 3 also includes an input port 7 that communicates with the oil discharge port in an oil pump (oil pressure generating means) and is supplied with input oil pressure. Furthermore, the sleeve 3 includes an output port 8 through which output pressure, regulated by the spool valve 1, is outputted. The sleeve 3 additionally includes an exhaust port 9 that communicates with the low pressure side (i.e., the oil pan, etc.).

The oil ports, including the input port 7, output port 8, exhaust port 9, and the like, are holes extending through the side face of the sleeve 3. A drain port 11 is also included for communication with a diaphragm chamber. The drain port 11 is provided adjacent the linear solenoid 2. A F/B (Feedback) port 12 is also included between the drain port 11 and the input port 7. The input port 7 is provided between the F/B port 12 and the out put port 8. The out put port 8 is provided between the input port 7 and the exhaust port 9. The exhaust port 9 is provided between the output port 8 and the drain port 13. The drain port 13 provides communication with a spring chamber, and the drain port 13 is provided on an end of the sleeve 3 opposite the linear solenoid 2. The F/B port 12 communicates with the output port 8 and generates a F/B oil pressure corresponding to an output pressure in the spool 4.

The spool 4 is provided in the sleeve 3 and can slide in the axial direction thereof. The spool 4 includes an input seal seat 14 that seals the input port 7, an exhaust seal seat 15 that seals the exhaust port 9, and a F/B seat 16 that is smaller in diameter than the input seal seat 14. A distribution chamber 17 is included between the input seal seat 14 and the exhaust seal seat 15, and a F/B chamber 18 is included between the input seal seat 14 and the F/B seat 16. The F/B seat 16 seals the area between the F/B chamber 18 and the diaphragm chamber.

The F/B seat 16 is so provided that its seat diameter is smaller than the seat diameter of the input seal seat 14. For this reason, as the oil pressure (output pressure) applied to the F/B chamber 18 is increased, axial force that resists the spring load of the return spring 5 is produced by differential pressure due to the seat difference between the input seal seat 14 and the F/B seat 16. Thus, the displacement of the spool 4 is stabilized, and output pressure is unlikely to fluctuate due to fluctuation of input pressure. The spool 4 comes to rest in a position where the spring load of the return spring 5, the driving force for the spool 4 from the linear solenoid 2, and the axial force due to the seat difference between the input seal seat 14 and the F/B seat 16 are balanced with one another.

The spool 4 is provided with a shaft 19 extended into the linear solenoid 2. An end of the shaft 19 is abutted against an end face of the plunger 32, to be described, so that the plunger 32 directly drives the spool 4.

During operation, the spool 4 is displaced in the axial direction by operation of the linear solenoid 2. This varies the ratio of the input-side seal length (lap $\alpha$) in the input port 7 and the distribution chamber 17 by the input seal seat 14 to the exhaust-side seal length (lap $\beta$) in the distribution chamber 17 and the exhaust port 9 by the exhaust seal seat 15. As a result, the output pressure of oil generated at the output port 8 is varied.

The return spring 5 acts as a biasing member that biases the plunger 32, to be described, in a first direction along the axis, A (i.e., to the right in FIG. 3). In the embodiment shown, the return spring 5 is a coil spring spirally formed in a cylindrical shape. The return spring 5 biases the spool 4 to the valve opening side. (The valve opening side is a side on which the input-side seal length is shortened and an output pressure is increased. In this example, it is the right side in FIG. 3.) The return spring 5 is provided in the spring chamber in the sleeve 3. One end of the return spring 5 is abutted against the bottom face of an adjusting screw 21 that closes the left end of the insertion hole 6 in the sleeve 3 in FIG. 3. The other end of the return spring 5 is abutted against an end face of the exhaust seal seat 15. In the embodiment shown, the spring load of the return spring 5 can be adjusted by an amount by which the adjusting screw 21 is tightened.

The linear solenoid 2 includes a coil 31, the plunger 32, a stator 33, the yoke 34, and a connector 35. The coil 31, the plunger 32, the stator 33, and the yoke 34 each share the common axis, A. When a current is transmitted through the coil 31, a magnetic force is generated to form a magnetic flux loop that runs through the plunger 32 and a magnetic stator (stator 33, yoke 34). The coil 31 is formed by winding an insulated wire around a resin bobbin 31a.

The plunger 32 is formed in substantially columnar shape and is made of a magnetic metal (e.g. iron, a soft magnetic material that constructs a magnetic circuit, etc.). The plunger 32 slides on the inner circumferential surface of the stator 33. The plunger 32 abuts against an end of the shaft 19, and the plunger 32 is biased toward the valve opening side (right side in FIG. 3), together with the spool 4, by the spring load of the return spring 5 transmitted to the spool 4. A hole 32a extending through the plunger 32 in the axial direction provides fluid communication between the chambers at both ends of the plunger 32.

The stator 33 is formed of magnetic metal (e.g. iron, a soft magnetic material that constructs a magnetic circuit). The stator 33 includes an attracting stator 33a that magnetically attracts the plunger 32 in the axial direction and a sliding stator 33b that encompasses the plunger 32. The sliding stator 33b delivers and receives magnetic flux in the radial direction to and from the plunger 32. The attracting stator 33a and the sliding stator 33b are magnetically shielded from each other by a magnetically shielding groove 33c (i.e., a portion where a magnetic resistance is increased).

The inner circumferential surface 33d of the stator 33 supports the plunger 32 so that the plunger 32 can slide in the axial direction of the stator 33. The inner circumferential surface 33d has a constant diameter D and extends from one end to the other end of the stator 33.

The attracting stator 33a is provided between the sleeve 3 and the coil 31, and the attracting stator 33a is magnetically coupled with the opening in the yoke 34. During operation, the attracting stator 33a magnetically attracts the plunger 32 to the valve closing side due to magnetic force generated by the coil 31. (The valve closing side is a side on which the input port 7 is closed and an output pressure is reduced. In this example, it is the left side in FIG. 3.)

The attracting stator 33a has a cylindrical portion. The outer circumferential surface of the cylindrical portion of the attracting stator 33a is tapered. The attracting stator 33a is so constructed that a magnetic attractive force suitable for an amount of stroke of the plunger 32 is obtained.

The sliding stator 33b has a substantially cylindrical shape and encompasses substantially the entire outer surface of the plunger 32. The sliding stator 33b is inserted into the cylindrical hole formed in the bottom of the yoke 34, and the sliding stator 33b is magnetically coupled with the inner circumferential surface of the cylindrical hole. The sliding stator 33b slides on the plunger 32 and supports the plunger 32 so that the plunger 32 can be slid in the axial direction. Further, the sliding stator 33b delivers and receives magnetic flux in the radial direction to and from the plunger 32.

The yoke 34 is substantially cup-shaped and encompasses the coil 31. The yoke 34 allows magnetic flux to pass, and is made of magnetic metal (e.g. iron, a soft magnetic material that constructs a magnetic circuit). The yoke 34 is firmly joined with the sleeve 3 by caulking lugs formed at its open end.

In the joint between the spool valve 1 and the linear solenoid 2, there is provided a diaphragm 36 that divides the interior of the sleeve 3 from the interior of the linear solenoid 2. The diaphragm 36 is formed of rubber substantially in a ring shape, and a peripheral portion of the diaphragm 36 is clamped between the sleeve 3 and the stator 33. The central portion of the diaphragm is fit in the groove 19a formed in the outer surface of the shaft 19. The diaphragm 36 reduces (e.g., eliminates) the ingress of oil and foreign matter from the sleeve 3 into the linear solenoid 2.

The connector 35 is a connecting means for electrical connection with an electronic control device (not shown) that controls the electromagnetic hydraulic control valve through a connecting line. The connector 35 includes terminals 35a respectively connected with both the ends of the coil 31.

The electronic control device controls an amount of transmitted current (current value) supplied to the coil 31 by duty ratio control. More specifically, the electronic control device controls an amount of current transmitted through the coil 31, and thereby linearly displaces the plunger 32 and the spool 4 against the spring load of the return spring 5. As such, the ratio of the input-side seal length (lap α) to the exhaust-side seal length (lap β) changes to control the output pressure produced at the output port 8.

As the plunger 32 moves, the inner volume of the area between the end face (face on the right in FIG. 3) of the plunger 32 and the bottom face (face on the left in FIG. 3) of the yoke 34 varies.

For this reason, a passage fluidly connects the bottom face of the yoke 34 with the outside of the yoke 34. The linear solenoid 2 is disposed in oil, and the breathing passage is an oil passage that guides oil to the bottom face of the yoke 34. A description will be given to a conventional passage with reference to FIG. 1A. The passage is provided by forming a recessed portion in the yoke 34. More specifically, the recessed portion includes a first recessed portion 42 that connects a connector opening 41 in which the base portion of the connector 35 is fit and the bottom side of the coil 31. A second recessed portion 43 is also included that connects the first recessed portion 42 and the bottom portion of the yoke 34.

When the end face of the plunger 32 and the bottom face of the yoke 34 abut, the area between the end face of the plunger 32 and the bottom face of the yoke 34 is under negative pressure. Also, the initial movement of the plunger 32 is hindered when a current begins to be transmitted through the coil 31, especially when a high-viscosity oil is used.

Thus, a circular recessed portion J1 is formed in the bottom face of the yoke 34 to provide a partial space between the end face of the plunger 32 and the bottom face of the yoke 34. The circular recessed portion J1 is connected to the above-mentioned second recessed portion 43 so that oil can flow into and out of the space formed between the end face of the plunger 32 and the bottom face of the yoke 34. Thus, the initial movement of the plunger 32 is facilitated.

Figure 1A:
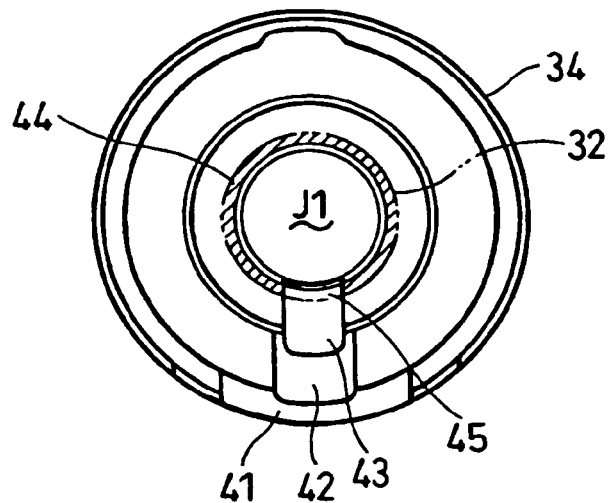
FIG. 1A is an axial sectional view of an electromagnetic valve of the prior art.
Figure 2A:
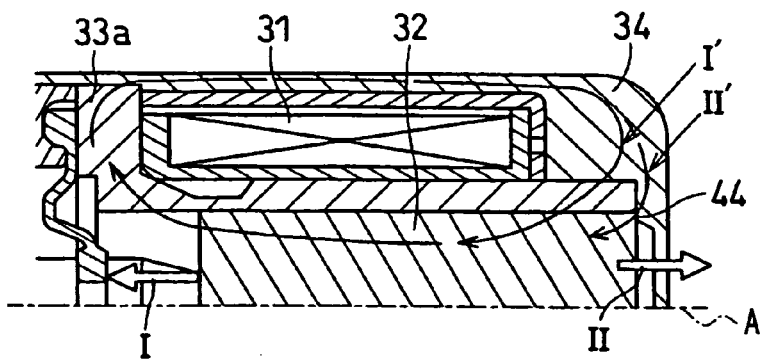
FIG. 2A is a longitudinal sectional view of the valve.

When current transmission through the coil 31 is stopped (off), the biasing member 5 biases the plunger 32 such that the plunger 32 abuts the bottom face of the yoke 34. More specifically, the end face of the plunger 32 at its outer circumferential edge contacts the bottom face of the yoke 34 as indicated by cross-hatching in FIG. 1A. When current transmission begins, magnetic flux I' flows such that the attracting stator 33a magnetically attracts the plunger 32 in the second direction along the axis (i.e., to the left in FIG. 2A). In addition, magnetic flux II' also flows in the abutted portion 44 between the end face of the plunger 32 and the bottom face of the yoke 34. Thus, in addition to the first force I by which the attracting stator 33a magnetically attracts the plunger 32, the second force II in the direction in which the plunger 32 is attracted to the bottom face of the yoke 34 is generated.

Figure 1B:
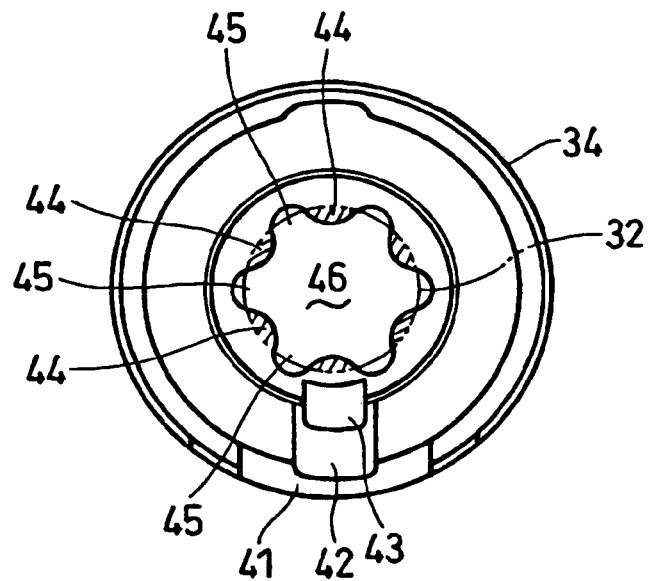
FIG. 1B is an axial sectional view of an electromagnetic valve constructed according to the present disclosure.

As shown in FIG. 1B, the plunger 32 abuts the yoke 34 at a plurality of abutted portions 44 spaced circumferentially about the axis, A, of the plunger 32. Between the plural abutted portions 44, there are provided non-contact portions 45 where the plunger 32 and the bottom face of the yoke 34 are spaced away from each other in the direction of the axis, A. Also, the plural abutted portions 44 are spaced away from each other at equal intervals circumferentially about the axis, A. Furthermore, the plural abutted portions 44 each have approximately the same amount of area of abutment.

The non-contact portions 45 are provided by a recessed portion 46 formed in the bottom face of the yoke 34. At each non-contact portion 45, the recessed portion 46 extends radially away from the axis, A, of the yoke 34 beyond the outer circumferential edge of the plunger 32 as viewed in the axial direction.

In the embodiment shown in FIG. 1B, the recessed portion 46 is approximately star-shaped with a plurality of points (e.g., six points). As such, the points of the star extend radially away from the axis, A, and protrude outward from the outer circumferential edge of the plunger 32. As viewed in the axial direction, the abutted portion 44 and the non-contact portion 45 are alternately spaced in the circumferential direction. The axial area of the star-shaped recessed portion 46 in the embodiment of FIG. 1A is larger than the axial area of the conventional circular recessed portion J1 (FIG. 1B). The star-shaped recessed portion 46 is formed by a cutting process, for example. It will be appreciated that the depth (axial length) of the star-shaped recessed portion 46 may be constant or may be varied continuously or stepwise.

As mentioned above, the star-shaped recessed portion 46 includes points that protrude beyond the outer circumferential edge of the plunger 32. Therefore, the points of the recessed portion 46 each act as a breathing groove, and connect the area of the recessed portion covered by the plunger 32 with the area outside the edge of the plunger 32. For this reason, the above-mentioned second recessed portion 43 need not extend to the inside of the star-shaped recessed portion 46. As illustrated in FIG. 1B, the second recessed portion 43 only has to connect the first recessed portion 42 and the outside of the outer circumferential edge of the plunger 32.

Effects of First Embodiment

The linear solenoid 2 in the first embodiment is so constructed that the plunger 32 and the bottom face of the yoke 34 abut only at the outer circumferential edge of the plunger 32 as viewed in the axial direction. However, the abutted portion 44 where the plunger 32 and the bottom face of the yoke 34 abut is divided into a plurality of portions in the circumferential direction. Further, a non-contact portion 45 is provided between the abutted portions 44.

Thus, there is a plurality of abutted portions 44 divided by the plurality of non-contact portions 45. As such, the area of contact between the plunger 32 and the bottom face of the yoke 34 can be reduced as compared with conventional cases.

Figure 2B:
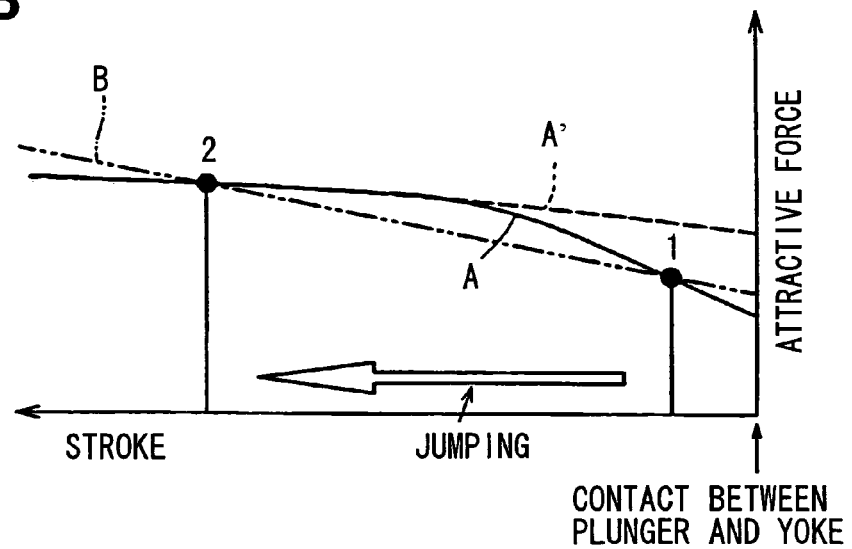
FIGS. 2B and 2C are graphs illustrating jumping in hydraulic characteristics.

As a result, when current transmission through the coil 31 begins and magnetic flux begins to flow in the abutted portions 44 between the end face of the plunger 32 and the bottom face of the yoke 34, the second force II (FIG. 2A) can be reduced as compared with conventional cases. For this reason, as indicated by broken line A' in FIG. 2B, reduction in attractive force that acts on the plunger 32 is less likely especially on the side where the stroke of the plunger 32 is small.

Figure 2C:
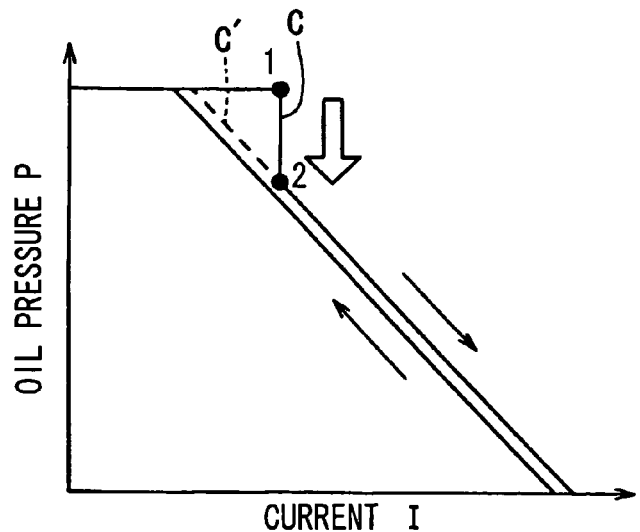

Since the second force II is reduced, the number of balance points at which the plunger 32 is balanced in the axial direction can be reduced to one, and the jumping phenomenon of the plunger 32 is unlikely. As indicated by broken line C' in FIG. 2C, the "jumping phenomenon in hydraulic characteristics" is unlikely, and the accuracy of the hydraulic control by the electromagnetic spool valve can be enhanced.

Even when two balance points are produced, the above effect can still be obtained. Since the second force II is small as compared with conventional cases, the amount of jumping of the plunger 32 can be reduced. As a result, the amount of jumping in oil pressure due to the jumping phenomenon in hydraulic characteristics can be reduced. Thus, the accuracy of the hydraulic control by the electromagnetic spool valve can be enhanced.

Furthermore, as mentioned above, the abutted portions 44 are spaced about the axis, A, at equal intervals in the circumferential direction. Also, the area of each of the abutted portions 44 is substantially equal. Therefore, the second force II is uniformly applied to the plunger 32 in the radial direction and in the circumferential direction. That is, there is more balance in the magnetic circuit due to the second force II as compared to the prior art. Thus, the plunger 32 is more likely to remain co-axial with the stator 33 and is unlikely to be inclined at an angle relative thereto for more even sliding movement. As a result, the accuracy of the hydraulic control by the electromagnetic spool valve can be enhanced.

The non-contact portions 45 are provided by the star-shaped recessed portion 46 formed in the bottom face of the yoke 34. The recessed portion 46 extends radially beyond the outer circumferential edge of the plunger 32 at a plurality of locations (i.e., the points of the recessed portion 46). For this reason, the recessed portion 46 acts as a breathing groove to connect the area of the recessed portion 46 covered by the plunger 32 with the area outside the edge of the plunger 32. For this reason, oil can easily flow within the recessed portion 46. Thus, even when oil viscosity is high, the initial movement of the plunger 32 is facilitated.

Furthermore, it will be appreciated that conventional solenoids can be re-tooled to incorporate features of the embodiment of FIG. 1B. This embodiment can be applied just by changing the conventional circular recessed portion J1 (FIG. 1A) to the star-shaped recessed portion 46 (FIG. 1B). Therefore, manufacturing costs of the linear solenoid 2 can be reduced.

Second Embodiment

Figure 4:
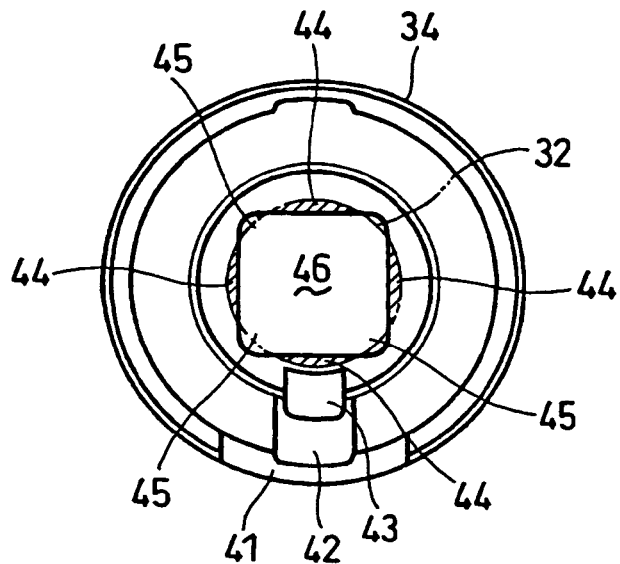
FIG. 4 is an axial sectional view of the electromagnetic valve constructed according to the present disclosure in another embodiment.

Referring now to FIG. 4, another embodiment is shown. It will be appreciated that components similar to those of the embodiment of FIG. 1B are indicated by similar reference numerals.

In this embodiment, the recessed portion 46 is substantially rectangular (e.g., square-shaped). The plunger 32 is circular similar to the embodiment of FIG. 1B. The width from corner-to-corner of the recessed portion 46 is greater than the diameter of the plunger 32, and the centers of the of plunger 32 and recessed portion 46 are aligned. As such, there is a plurality of abutted portions 44 (i.e., four abutted portions 44) separated by a plurality of non-contact portions 45. Accordingly, the same advantages as described above in relation to the embodiment of FIG. 1B are achieved.

Third Embodiment

Figure 5:
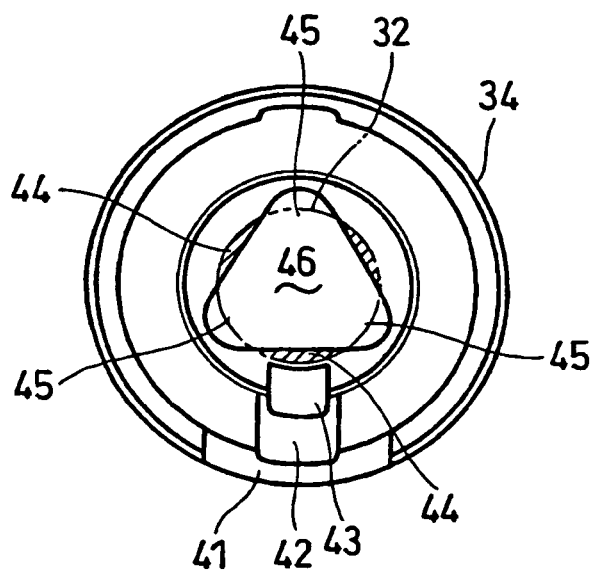
FIG. 5 is an axial sectional view of the electromagnetic valve constructed according to the present disclosure in another embodiment.

Referring now to FIG. 5, another embodiment is shown. It will be appreciated that components similar to those of the embodiment of FIG. 1B are indicated by similar reference numerals.

In this embodiment, the recessed portion 46 is substantially triangular. The center of the recessed portion 46 is aligned with the center of the plunger 32. Also, the points of the recessed portion 46 extend beyond the edge of the plunger 32. As such, there is a plurality of abutted portions 44 (i.e., three abutted portions 44) separated by a plurality of non-contact portions 45. Accordingly, the same advantages as described above in relation to the embodiment of FIG. 1B are achieved.

Fourth Embodiment

Figure 6A:
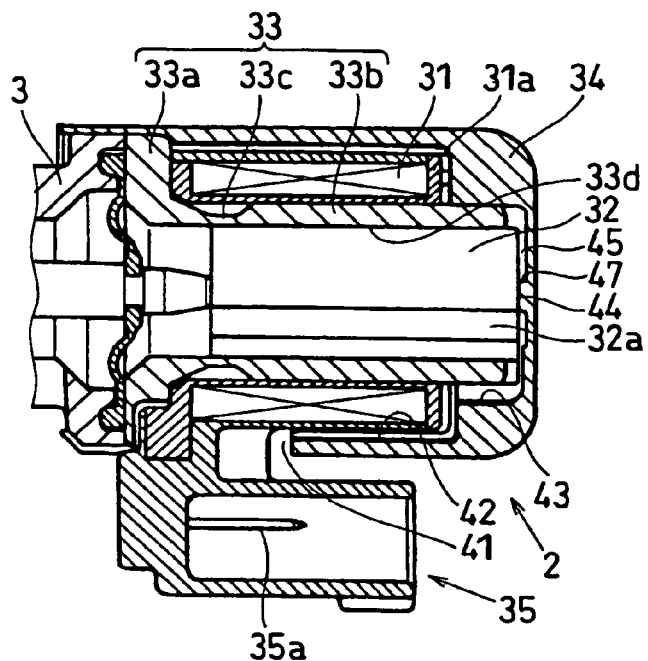
FIG. 6A is a longitudinal sectional view of the electromagnetic valve constructed according to the present disclosure in another embodiment.
Figure 6B:
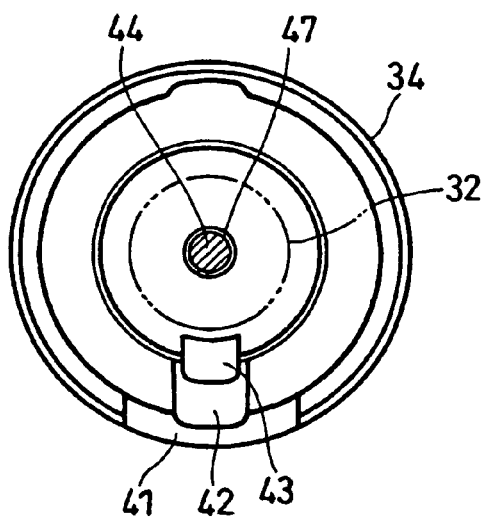
FIG. 6B is an axial sectional view of the electromagnetic valve of FIG. 6A.

Referring now to FIGS. 6A and 6B, another embodiment is shown. It will be appreciated that components similar to those of the embodiment of FIG. 1B are indicated by similar reference numerals.

The fourth embodiment is so constructed that the plunger 32 and the bottom face of the yoke 34 abut each other at an abutted portion 44 provided within the outer circumferential edge of the plunger 32 as viewed in the axial direction. The abutted portion 44 is encircled throughout its circumference with a non-contact portion 45 where the plunger 32 and the bottom face of the yoke 34 are spaced away from each other along the axis, A.

The abutted portion 44 is provided by a projected portion 47 formed on the bottom face of the yoke 34 that projects toward the plunger 32. It will be appreciated that the projected portion 47 could also be included on the plunger 32 and project toward the yoke 34. The non-contact portion 45 is provided around the projected portion 47.

Thus, the space between the end face of the plunger 32 and the bottom face of the yoke 34 communicates with the peripheral side of the plunger 32 through the non-contact area 45 surrounding the projected portion 47. For this reason, oil easily flows in the space between the end face of the plunger 32 and the bottom face of the yoke 34. Thus, even when an oil viscosity is high the initial movement of the plunger 32 is facilitated.

In the embodiment shown, there is one abutted portion 44. The axial center of the abutted portion 44 is aligned with the axial center of the plunger 32. Therefore, the magnetic circuit due to the second force II is more likely to be balanced.

Figure 6C:
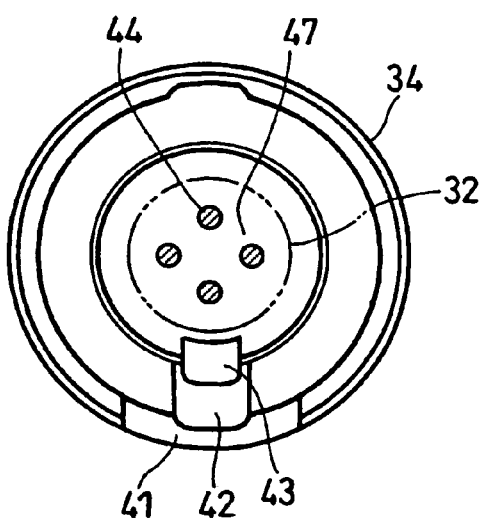
FIG. 6C is an axial sectional view of another embodiment of the electromagnetic valve.

In another embodiment shown in FIG. 6C, there are a plurality of abutted portions 44 provided within the circumferential edge of the plunger 32. The abutted portions 44 are provided at equal radial distances from the axis, A, of the plunger 32, at equal intervals in the circumferential direction, and have the same area. As such, the magnetic circuit due to the second force II is more likely to be balanced.

Even when the abutted portions are provided as in the fourth embodiment, the same effects as in the first embodiment can be obtained.

Modifications

In the examples described in connection with the above embodiments, the linear solenoid is employed for an electromagnetic hydraulic control valve that is used in a hydraulic control device for automatic transmissions. In another embodiment, the linear solenoid may be applied to any suitable device, such as an electromagnetic hydraulic control valve other than those for use in an automatic transmission.

In the examples described in connection with the above embodiments, the linear solenoid is applied to an electromagnetic hydraulic control valve of N/O type. Instead, the linear solenoid may be applied to an electromagnetic hydraulic control valve of N/C (Normally Closed) type.

In the examples described in connection with the above embodiments, a three-way valve is described. However, the spool valve 1 need not be a three-way valve. The invention may be applied to a linear solenoid that drives a valve device of any other structure.

In the examples described in connection with the above embodiments, the invention is applied to a linear solenoid 2 that drives a valve device, such as a spool valve 1. The object to be driven need not be a valve device, and the invention may be applied to a linear actuator used as an actuator for any other device. That is, the invention can be applied to all the linear actuators in which a plunger 32 is driven in the axial direction.

While only the selected example embodiments have been chosen to illustrate the present invention, it will be apparent to those skilled in the art from this disclosure that various changes and modifications can be made therein without departing from the scope of the invention as defined in the appended claims. Furthermore, the foregoing description of the example embodiments according to the present invention is provided for illustration only, and not for the purpose of limiting the invention as defined by the appended claims and their equivalents.

What is claimed is:

1. A linear solenoid with an axis comprising:
a coil that generates magnetic force due to transmission of current therethrough;
a plunger with an end face;
a stator that movably supports the plunger; and
a yoke including a bottom face,
wherein a biasing member biases the plunger in a first direction along the axis;
wherein the stator magnetically attracts the plunger when current is transmitted through the coil so as to move the plunger in a second direction along the axis opposite to the first direction;
wherein, when current transmission through the coil is stopped, the biasing member biases the plunger to abut the bottom face of the yoke at a plurality of abutted portions; and
wherein non-contact portions are included between the abutted portions at the periphery of the plunger, the non-contact portions extending beyond the periphery of the plunger, and the plunger and the yoke are spaced away from each other in the direction of the axis by the non-contact portions.

2. The linear solenoid according to claim 1, wherein the abutted portions are spaced way from each other circumferentially about the axis at substantially equal intervals.

3. The linear solenoid according to claim 1, wherein the abutted portions have approximately equal areas.

4. The linear solenoid according to claim 1, wherein the bottom face of the yoke includes a recessed portion so as to define the non-contact portions.

5. The linear solenoid according to claim 4, wherein the recessed portion extends radially away from the axis beyond an edge of the plunger as viewed along the axis.

6. The linear solenoid according to claim 1, wherein the linear solenoid is employed in combination with a spool valve having a spool that is moved by the plunger and a sleeve that movably supports the spool, the spool valve including the biasing member.

7. The linear solenoid according to claim 6, wherein the spool valve is a hydraulic control valve that controls oil pressure.

8. A linear solenoid with an axis comprising:
a coil that generates magnetic force due to transmission of current therethrough;
a plunger with an end face and an edge;
a stator that movably supports the plunger; and
a yoke including a bottom face,
wherein a biasing member biases the plunger in a first direction along the axis;
wherein the stator magnetically attracts the plunger when current is transmitted through the coil so as to move the plunger in a second direction along the axis opposite to the first direction;
wherein, when current transmission through the coil is stopped, the biasing member biases the plunger to abut the bottom face of the yoke at an abutted portion;
wherein the abutted portion is provided within the edge of the plunger when viewed along the axis; and
wherein the abutted portion is alternately spaced with a non-contact portion at the edge of the plunger, and the plunger and the stator are spaced away from each other in the direction of the axis by the non-contact portion, the non-contact portion extending beyond the edge of the plunger.

9. The linear solenoid according to claim 8, wherein an axial center of the abutted portion is aligned with an axial center of the plunger.

10. The linear solenoid according to claim 8, wherein the plunger abuts the yoke at a plurality of abutted portions.

11. The linear solenoid according to claim 10, wherein the abutted portions are spaced way from each other circumferentially about the axis at substantially equal intervals.

12. The linear solenoid according to claim 10, wherein the abutted portions have approximately the same area.

13. The linear solenoid according to claim 8, wherein the bottom face of the yoke includes a recessed portion so as to define the non-contact portion.

14. The linear solenoid according to claim 13, wherein the recessed portion extends radially away from the axis beyond the edge of the plunger as viewed along the axis.

15. The linear solenoid according to claim 8, wherein the bottom face of the yoke includes a projected portion that extends toward the plunger.

16. The linear solenoid according to claim 8, wherein the linear solenoid is employed in combination with a spool valve having a spool that is moved by the plunger and a sleeve that movably supports the spool, the spool valve including the biasing member.

17. The linear solenoid according to claim 16, wherein the spool valve is a hydraulic control valve that controls oil pressure.

18. A linear solenoid with an axis comprising:
a coil that generates magnetic force due to transmission of current therethrough;
a plunger with an end face;
a stator that movably supports the plunger; and
a yoke including a bottom face,
wherein a biasing member biases the plunger in a first direction along the axis;
wherein the stator magnetically attracts the plunger when current is transmitted through the coil so as to move the plunger in a second direction along the axis opposite to the first direction;
wherein, when current transmission through the coil is stopped, the biasing member biases the plunger to abut the bottom face of the yoke at a plurality of abutted portions;
wherein a non-contact portion is included between the abutted portions where the plunger and the stator are spaced away from each other in the direction of the axis; and
wherein the abutted portions are spaced way from each other circumferentially about the axis at substantially equal intervals.

19. A linear solenoid with an axis comprising:
a coil that generates magnetic force due to transmission of current therethrough;
a plunger with an end face;
a stator that movably supports the plunger; and
a yoke including a bottom face,
wherein a biasing member biases the plunger in a first direction along the axis;
wherein the stator magnetically attracts the plunger when current is transmitted through the coil so as to move the plunger in a second direction along the axis opposite to the first direction;
wherein, when current transmission through the coil is stopped, the biasing member biases the plunger to abut the bottom face of the yoke at a plurality of abutted portions;
wherein a non-contact portion is included between the abutted portions where the plunger and the stator are spaced away from each other in the direction of the axis; and
wherein the abutted portions have approximately equal areas.

20. A linear solenoid with an axis comprising:
a coil that generates magnetic force due to transmission of current therethrough;
a plunger with an end face and an edge;
a stator that movably supports the plunger; and
a yoke including a bottom face,
wherein a biasing member biases the plunger in a first direction along the axis;
wherein the stator magnetically attracts the plunger when current is transmitted through the coil so as to move the plunger in a second direction along the axis opposite to the first direction;
wherein, when current transmission through the coil is stopped, the biasing member biases the plunger to abut the bottom face of the yoke at an abutted portion;
wherein the abutted portion is provided within the edge of the plunger when viewed along the axis;
wherein a non-contact portion is included where the plunger and the stator are spaced away from each other in the direction of the axis;
wherein the plunger abuts the yoke at a plurality of abutted portions; and
wherein the abutted portions are spaced way from each other circumferentially about the axis at substantially equal intervals.

21. A linear solenoid with an axis comprising:
a coil that generates magnetic force due to transmission of current therethrough;
a plunger with an end face and an edge;
a stator that movably supports the plunger; and
a yoke including a bottom face,
wherein a biasing member biases the plunger in a first direction along the axis;
wherein the stator magnetically attracts the plunger when current is transmitted through the coil so as to move the plunger in a second direction along the axis opposite to the first direction;
wherein, when current transmission through the coil is stopped, the biasing member biases the plunger to abut the bottom face of the yoke at an abutted portion;
wherein the abutted portion is provided within the edge of the plunger when viewed along the axis;
wherein a non-contact portion is included where the plunger and the stator are spaced away from each other in the direction of the axis;
wherein the plunger abuts the yoke at a plurality of abutted portions; and
wherein the abutted portions have approximately the same area.

22. A linear solenoid with an axis comprising:
a coil that generates magnetic force due to transmission of current therethrough;
a plunger with an end face and an edge;
a stator that movably supports the plunger; and
a yoke including a bottom face,
wherein a biasing member biases the plunger in a first direction along the axis;
wherein the stator magnetically attracts the plunger when current is transmitted through the coil so as to move the plunger in a second direction along the axis opposite to the first direction;
wherein, when current transmission through the coil is stopped, the biasing member biases the plunger to abut the bottom face of the yoke at an abutted portion;

wherein the abutted portion is provided within the edge of the plunger when viewed along the axis;

wherein a non-contact portion is included where the plunger and the stator are spaced away from each other in the direction of the axis; and wherein the bottom face of the yoke includes a projected portion that extends toward the plunger.

* * * * *